(No Model.)

J. L. ACKERMAN.
MEASURING DEVICE.

No. 544,398. Patented Aug. 13, 1895.

Witnesses
John Finnie
M. A. Drain

Inventor
Jasper L. Ackerman
By his Attorney

UNITED STATES PATENT OFFICE.

JASPER L. ACKERMAN, OF MONON, INDIANA.

MEASURING DEVICE.

SPECIFICATION forming part of Letters Patent No. 544,398, dated August 13, 1895.

Application filed August 11, 1894. Serial No. 520,011. (No model.)

*To all whom it may concern:*

Be it known that I, JASPER L. ACKERMAN, a citizen of the United States, residing at Monon, in the county of White and State of Indiana, have invented certain new and useful Improvements in Measuring Devices; and I do declare the following to be a full, clear, and exact description of the invention, such as will enable others skilled in the art to which it appertains to make and use the same.

My invention has relation to a measuring device adapted more especially for measuring uniform quantities of shot or powder for loading cartridges for shotguns, &c., and among the objects in view is to provide an extremely simple and inexpensive measuring device which is adapted to be readily operated by the thumb to cause the surplus shot or powder to be thrown off the measure to thereby at each operation permit only a definite and predetermined quantity of the material to be measured, thus insuring a uniform load.

A further object of my invention is to provide a measuring device which may be adjusted so as to vary the quantity of material measured thereby; and with the above and other objects in view the invention consists in the novel construction, arrangement, and combination of parts, as hereinafter fully described, shown in the accompanying drawings, and pointed out in the appended claims.

Figure 1:
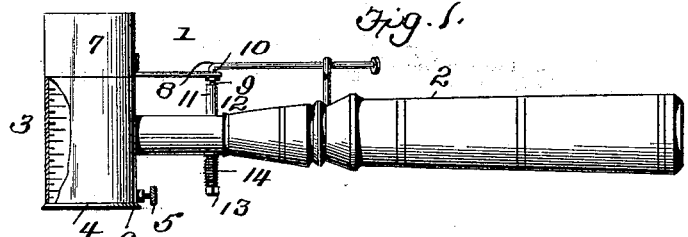
Figure 2:
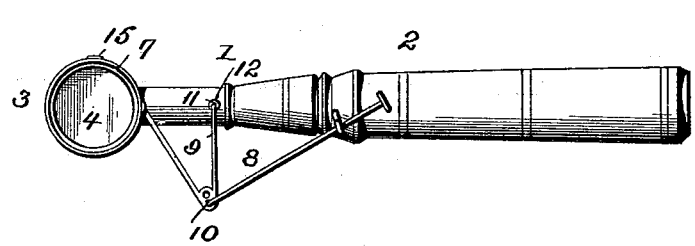
Figure 3:
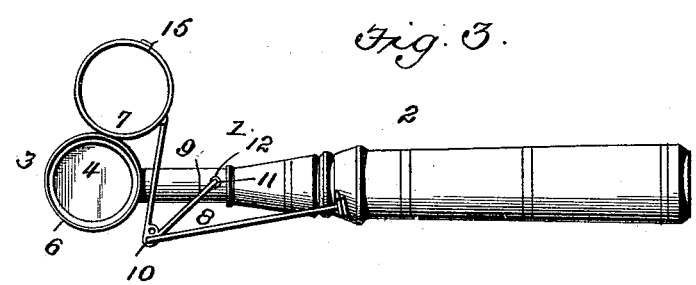
Figure 4:
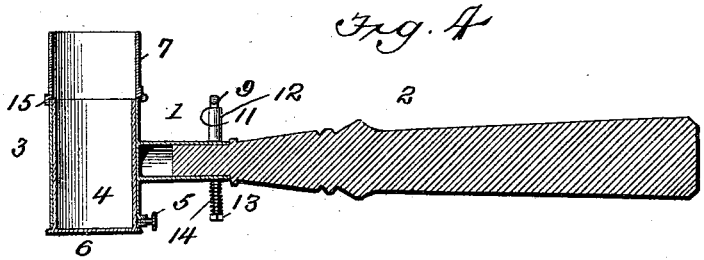
Figure 5:
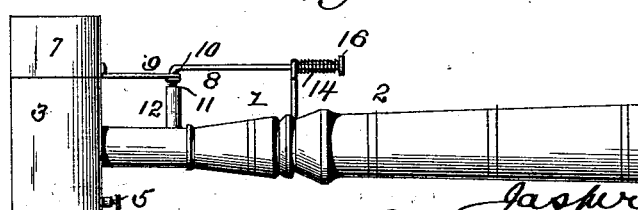

In the drawings, Figure 1 is a side elevation of my improved measuring device. Fig. 2 is a top plan view of the same; Fig. 3, a similar view showing the scraper or leveling section in the position it assumes when it has scraped the surplus material from the measure. Fig. 4 is a vertical sectional view of the device. Fig. 5 is a side elevation showing a modified arrangement of the coiled spring.

I would state that my invention comprises essentially a supporting-handle, a measure carried thereby, and a horizontally swinging or movable scraper or the like adapted to be operated to sweep the surplus material from the measure. This scraper may be operated in any suitable manner and by any suitable means.

My invention also comprises a measure provided with an adjustable section or bottom, which adjustable section may be adjustably secured in position by any suitable means.

In order that the various parts of my device may be clearly understood, both as to their construction and operation, I will proceed to describe the same in detail.

1 indicates my improved measuring device, which comprises a suitable supporting-handle 2 and the measure proper 3. The latter may be of any desired shape, though I preferably make the same cylindrical, as shown, and is adapted to receive and measure the shot, powder, &c., which is required to load the cartridges.

4 indicates an adjustable section of the measure, the same corresponding in shape to the measure and is adapted to slide within the latter so as to provide a bottom therefor, and said adjustable section is preferably secured in its adjusted position by means of an adjusting-screw 5, which works within a threaded perforation in the measure and impinges upon the adjustable section 4.

If desired, the inside surface of the measure may be provided with notches or cut to indicate the degree to which the adjustable section is to be adjusted.

By adjusting the section 4 until its flange 6 lies against the bottom edge of the measure the latter will measure a minimum amount, and by lowering the section 4 the measure will measure off variable quantities of material.

For the purpose of enabling exact and uniform quantities of material to be measured at each respective adjustment of the section 4 I provide a section 7, adapted to perform the function of a scraper, said section 7 being of any desired shape, it only being necessary that said section should have a horizontal swinging movement imparted to it to cause it to sweep off all surplus material remaining above the upper edge of the measure. I show said scraper as being of cylindrical form, and prefer said shape for the reason that when in its normal position (seen in Fig. 2) it serves also as a funnel to enable the material to be readily fed into the measure. To the scraper is secured one end of a lever 8, bent as shown and pivotally connected to the handle 2, so as to adapt it to swing horizontally, said scraper in its normal position lying over and upon the upper edge of the measure, as shown.

For the purpose of operating the scraper I pivotally connect one end of a rod 9 to the lever 8 at the point 10, and said rod 9 passes rearwardly and through an eye or loop 11 of a vertically-arranged arm 12, carried by the handle, and between said eye and the shoulder or head 13 on the rod 9 is arranged a coiled spring 14, encircling said rod and exerting a stress upon the parts to maintain the scraper in its described normal position.

To limit the throw of the scraper in one direction I provide it with a depending lug or ear 15, which is adapted to strike against the side of the measure.

It will be seen that after the measure has been filled with the shot or powder the person by means of the thumb pushes the rod 9 in a direction toward the measure, which effects the horizontal swinging of the scraper and sweeps the surplus material off of the measure, when, by releasing the rod 9, the parts will return into their normal positions.

Instead of arranging the operating-spring as shown in Figs. 1 to 4, I may provide a different arrangement, as seen in Fig. 5, in which the lever 8 is extended through the handle and provided with a head 16 at its lower end, and I arrange the spring around the extended portion of the lever between the handle and head 16 and secure the opposite ends of the spring to said parts, so that when the rod 9 is pushed by the thumb and the extended portion of the lever is partially rotated the spring will be coiled tighter around the lever, and upon the rod 9 being released the spring will return the parts to their original positions.

The operation of the described different arrangement of parts produces exactly similar results to those accomplished by the first-described arrangement.

I do not wish to be restricted to the precise construction and arrangement of parts described, as I may modify the same within certain limits without departing from the principle or sacrificing any of the advantages of my invention.

Having thus described my invention, what I claim, and desire to secure by Letters Patent, is—

1. The herein-described measuring device comprising a supporting handle, a cylindrical measure 3 carried by the handle and open at both ends, a cylindrical scraper 7 having a diameter corresponding to that of the measure and being open at both ends, a cylindrical section 4 having a fixed bottom and open at its upper end, the bottom of said section 4 constituting the bottom for the measuring device, and said section 4 being adjustable vertically within the measure 3 and adapted to form a prolongation thereof when extended to increase the measuring capacity of the device, an arm secured to the scraper, a second operating arm having a pivotal connection with the first arm, and said first arm having such pivotal connection with the handle as to effect a horizontal arc-shaped swinging movement of the scraper across the upper edge of the measure 3 to sweep the surplus material therefrom, and a spring acting upon the arms to normally hold the scraper over and in alignment with the measure.

2. The herein-described measuring device, comprising a supporting handle, a cylindrical measure 3 carried by the handle and open at both ends, a cylindrical scraper 7 having a diameter corresponding to that of the measure and being open at both ends, a cylindrical section 4 having a fixed bottom and open at its upper end, the bottom of said section 4 constituting the bottom for the measuring device, an angular arm secured at one end to the scraper and having a pivotal connection at its other end with the handle, a second arm pivotally connected at one end with the said angular arm intermediate the ends of the latter and having a sliding bearing at its opposite end upon a support carried by the handle, said second arm being arranged at an angle to the longitudinal axis of the supporting handle and also at an angle to the said angular arm, and a spring operating to maintain the arms in such normal position as to cause the scraper to lie over and in alignment with the measure 3, all arranged for the purpose specified.

In testimony whereof I affix my signature in presence of two witnesses.

JASPER L. ACKERMAN.

Witnesses:
O. McCONAHAY,
N. L. SANDERS.